United States Patent [19]

Yokokawa et al.

[11] Patent Number: 4,608,071

[45] Date of Patent: Aug. 26, 1986

[54] METHOD FOR REDUCING DIAMETER OF A GLASS ROD OR TUBE BY DRAWING

[75] Inventors: Kiyoshi Yokokawa; Kazuo Koya; Syouji Hosino, all of Gunma, Japan

[73] Assignee: Shin-Etsu Chemical Co., Ltd., Tokyo, Japan

[21] Appl. No.: 691,984

[22] Filed: Jan. 16, 1985

[30] Foreign Application Priority Data

Jan. 17, 1984 [JP] Japan ................................. 59-6120

[51] Int. Cl.$^4$ ...................... C03B 37/027; C03B 23/13
[52] U.S. Cl. ............................................. 65/13; 65/2; 65/64; 65/87; 65/102
[58] Field of Search ...................... 65/2, 13, 63, 64, 87, 65/102, 108

[56] References Cited

U.S. PATENT DOCUMENTS 3,582,305 6/1971 Dunlap et al. ................ 65/13 X
4,012,213 3/1977 Haggerty et al. ................ 65/13
4,061,484 12/1977 Aulich et al. ................ 65/2

Primary Examiner—Robert Lindsay
Attorney, Agent, or Firm—Wenderoth, Lind & Ponack

[57] ABSTRACT

The invention provides an efficient and accurate method for reducing the diameter of a rod or tube of glass, e.g. fused quartz glass rod as a base material of optical fibers, by drawing when the rod or tube is heated and in a softened and plastically deformable state. Different from conventional methods in which the glass rod or tube is held in a horizontal disposition and drawn in the horizontal axial direction or the rod or tube is held vertically and drawing is effected by the downward movement of the lower grip, the rod or tube in the inventive method is held vertically and drawing thereof is effected by the upward movement of the upper grip along with the gradual downward shift of the heating zone relative to the lower grip so that the problems in the prior art methods such as warp and an uneven diameter profile of the drawn rod or tube can be minimized.

5 Claims, 7 Drawing Figures

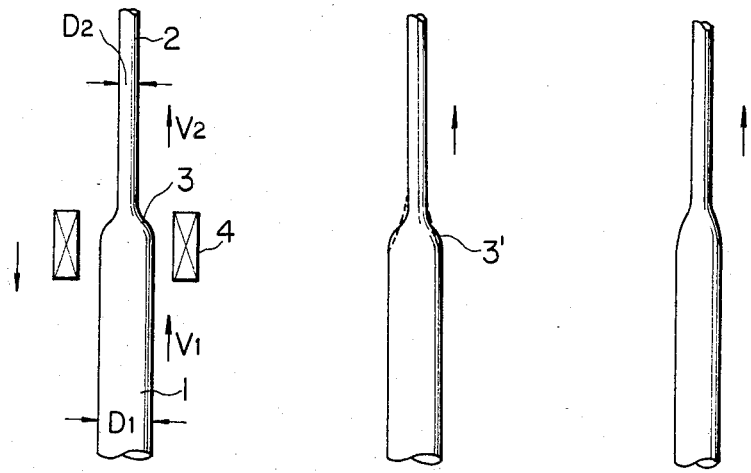

METHOD FOR REDUCING DIAMETER OF A GLASS ROD OR TUBE BY DRAWING

BACKGROUND OF THE INVENTION

The present invention relates to a method for reducing the diameter of a glass rod or tube by drawing when the rod or tube is heated and in a softened and plastically deformable condition. More particularly, the invention relates to a method for reducing the diameter of a fused quartz glass rod or tube as a base material or precursor of optical fibers by drawing the rod or tube to impart a controlled and reduced diameter.

One of the essential requirements in the optical fibers of fused quartz glass in respect of the performance thereof is that the diameter of the fibers must be very accurately controlled while the diameter of optical fibers is strongly influenced by the diameter of the quartz glass rod or tube as a base material or precursor thereof from which the optical fibers are obtained by spinning. Accordingly, many attempts and proposals have been made with an object of obtaining a glass or, in particular, quartz glass rod or tube having an exactly and accurately controlled diameter in the art of optical fibers. Most of these attempts and proposals are made in connection with the step of reducing the diameter of a base rod or tube by drawing while the glass rod or tube is heated and in a softened state capable of plastic deformation including the methods and apparatuses for the automatic control of the drawing velocity. In the conventional process of drawing, the quartz glass rod or tube is held horizontally and drawn in the horizontal direction or, alternatively, the base rod or tube is held vertically as gripped at the upper and lower ends thereof each with a clamp and drawing is performed by the downward movement of the lower clamp with simultaneous downward moving of the upper clamp at a somewhat smaller velocity than the upper clamp. In these drawing methods, the quartz glass rod or tube under drawing is usually rotated around its own axis.

In the first method of horizontal drawing, a drawback of downward bending of the glass rod or tube by gravity sometimes takes place in the heated and softened section thereof to cause a warp of the drawn rod or tube having a reduced diameter, although unevenness in the diameter profile of the drawn rod or tube can be mitigated by rotating the rod or tube under drawing, so that this method is not quite satisfactory as a practical process.

In the second method of downward vertical drawing, the glass rod or tube under drawing little suffers from the problem of warp as a consequence of vertical drawing direction so that the thus drawn rod or tube can have a straightforward configuration with little warp even when the descending glass rod or tube under drawing is not axially rotated. A problem in this case, however, is the sagging of the softened glass material in the plastically deformable condition in the portion under heating by its own weight to cause deformation in the outer profile of the drawn glass rod or tube to cause great difficulties in the accurate control of the diameter of the glass rod or tube after drawing. In particular, the stationary state of drawing can be reached only after a longer time from the start of drawing than in the horizontal drawing. When the velocity of drawing is small to obtain a small reduction of the diameter of the glass rod or tube or the temperature of the section under heating is high, sagging of the softened glass material increases so that the glass rod or tube as drawn may have a bulged portion having a larger diameter than the expected value which should have been determined from the descending velocities of the lower and upper clamps. Such a glass rod or tube having a non-uniform diameter profile is of course unacceptable as a commercial product.

SUMMARY OF THE INVENTION

It is therefore an object of the present invention to provide a novel method for reducing the diameter of a rod or tube of a glass or, in particular, fused quartz glass by drawing while the glass rod or tube is heated and in a plastically deformable softened state without the above described problems and drawbacks of warp or an uneven diameter profile of the drawn rod or tube.

Thus, the method of the present invention for reducing the diameter of a base rod or tube of glass comprises the steps of:

(a) holding the base rod or tube of glass in a substantially vertical disposition by gripping at the upper and lower ends thereof with an upper and a lower gripping means or clamps, respectively;

(b) heating a section of the glass rod or tube with an outer heating means or a heater so as to bring the glass material of the rod or tube in the section to a softened and plastically deformable state;

(c) moving the upper gripping means upwardly along the axial direction of the glass rod or tube while the lower gripping means is not moved upwardly along the axial direction of the glass rod or tube at a velocity not smaller than the upward moving velocity of the upper gripping means so that the glass rod or tube in the heated section is drawn to be imparted with a reduced diameter;

(d) successively decreasing the distance between the outer heating means and the lower gripping means; and (e) cooling the heated and softened glass rod or tube with plastic deformability in the section drawn and imparted with a reduced diameter to solidify.

BRIEF DESCRIPTION OF THE DRAWING

FIGS. 3a to 3c are schematic illustrations of the inventive method of the vertical upward drawing for the diameter reduction of a glass rod.

DETAILED DESCRIPTION OF THE PREFERRED EMBODIMENTS

Figure 1:
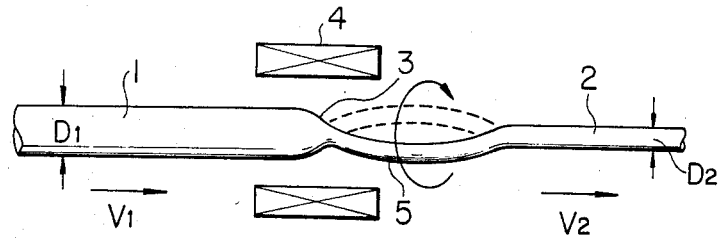
FIG. 1 is a schematic illustration of the prior art method of horizontal drawing for the diameter reduction of a glass rod.

Although the method of the present invention is a type of vertical drawing method for reducing the diameter of a glass rod or tube known per se, the most characteristic feature in the inventive method is in the upward movement of the upper gripping means or clamp which has never been proposed or undertaken in the prior art methods and can give a great advantage in the accurate control of the reduced diameter of a glass rod or tube to be extremely effective in the preparation of a base material or precursor of optical fibers.

The subject material of the inventive method is a rod or tube or glass or, in particular, fused quartz glass obtained by vitrification of a porous rod-like or tubular body of silica. The diameter and/or wall thickness of the glass rod and tube are not particularly limitative. In the inventive method, such a glass rod or tube is held in a substantially vertical disposition by gripping at the upper and lower ends thereof each with a gripping means or a clamp. The type of the clamp is not limitative and any of the conventionally used ones can be used here. It is preferable that each of the clamps is provided with a mechanism to rotate the clamp at a velocity equal to that of the other clamp so that the glass rod or tube under drawing can be rotated uniformly around its own axis.

The thus vertically held glass rod or tube is then heated at a section by use of an outer heating means or a heater so that the glass material is heated and softened into a plastically deformable state. The type of the heater is not particularly limitative including gas burners, electric resistance heaters, high-frequency induction heaters and the like. This heating is performed starting in the proximity of the upper clamp or near the upper end of the glass rod or tube and the section under heating is gradually shifted downwardly along the rod or tube relative to the lower gripping means as the heated and softened portion of the rod or tube has been drawn to have a reduced diameter. In other words, the distance between the outer heating means and the lower gripping means is gradually decreased by the relative movement of the heating means toward the lower gripping means. When the heating means is a gas burner, the gaseous fuel supplied to the burner may be hydrogen to produce an oxyhydrogen flame, town gas or liquefied petroleum gas according to need and it is particularly desirable to rotate the glass rod or tube under drawing in order to increase the uniformity of heating and to avoid the influence of the flame pressure blown at the glass rod or tube.

When the section of the glass rod or tube under heating has become softened and brought into a plastically deformable state, the upper gripping means or clamp is gradually moved upwardly relative to the lower gripping means along the axial direction of the rod or tube so that the softened and deformable portion of the rod or tube is drawn to be imparted with a reduced diameter. It is of course essential that the velocity of this upward movement of the upper gripping means should be controlled so as to obtain a desired reduction in the diameter of the glass rod or tube as accurately as possible. In this case, it is of course that the lower gripping means or clamp is not moved upwardly at a velocity not smaller than that of the upper gripping means in order that the glass rod or tube as drawn may be imparted with a reduced diameter. The lower gripping means can be moved upwardly along the axis of the glass rod or tube at a velocity smaller than that of the upper gripping means. Alternatively, the lower gripping means may be held at a fixed height.

As is mentioned above, the distance between the outer heating means and the lower gripping means is gradually decreased as the drawing of the glass rod or tube in the heated and softened section proceeds so tht the glass rod or tube can be drawn over the whole length thereof excepting the portions under gripping by the upper and lower gripping means. Such a decrease in the distance between the heating means and lower gripping means can be performed in several different combinations of the relative vertical movements of the heating means and the lower gripping means, for example, by holding the heating means at a fixed height and moving the lower gripping means upwardly or, alternatively, by moving the heating means downwardly while the lower gripping means is held at a fixed height. Downward movement of the outer heating means and upward movement of the lower gripping means can be combined, if desired. It is of course optional that both of the heating means and lower gripping means are moved upwardly provided that the velocity of the heating means is smaller than that of the lower gripping means which is smaller than the velocity of the upper gripping means.

In the drawing of a glass rod or tube to reduce the diameter with the outer heating means held at a fixed position, in general, an equation $V_1 \cdot D_1^2 = V_2 \cdot D_2^2$ is held, denoting the diameter of the base rod or tube before drawing, the diameter of the rod or tube after drawing, the feed velocity of the base rod or tube and the pulling velocity of the rod or tube having been imparted with the reduced diameter by $D_1$, $D_2$, $V_1$ and $V_2$, respectively. The feed velocity $V_1$ in the equation corresponds to the upward moving velocity of the lower gripping means and the pulling velocity $V_2$ corresponds to the upward moving velocity of the upper gripping means in this case. When the outer heating means is downwardly moved at a velocity of $V_3$, the equation should be modified to:

$$(V_1 + V_3) \cdot D_1^2 = V_2 \cdot D_2^2.$$

Though not essential, it is preferable also in the inventive method that the upper and the lower gripping means are rotated at the same velocity in the same direction around the axis of the glass rod or tube so that the uniformity of heating can be further increased. Control of the diameter of the drawn rod or tube can be performed by a known method. For example, the diameter of the glass rod or tube is measured at a portion just before the diameter reduction and the signal of the obtained value is fed back to the pulling velocity of the upper gripping means with a certain time lag or the diameter after the diameter reduction is measured to be fed back as a control signal to the pulling velocity of the upper gripping means. Computerized method can provide a means for the control of the diameter reduction with higher precision with determination of the profile of the glass rod or tube under diameter reduction with two or more sensors for the diameter measurement at different positions or heights. The determination of the diameter can be performed advantageously by a non-contacting measurement means using a laser instrument.

In the following, the method of the present invention is described in more detail with reference to the accompanying drawing making comparison with the prior art methods.

FIG. 1 and FIGS. 2a to 2c each illustrate the conventional methods of horizontal drawing and vertical downward drawing for the reduction of the diameter of a glass rod or tube, respectively. In FIG. 1, the glass base rod 1 having a diameter $D_1$ is held horizontally by a left and a right gripping means (not shown in the figure) and moved, while it is rotated around its own axis, in the direction of the axis at a constant feed velocity $V_1$ from the left to the right on the figure to be continuously introduced into the heating zone surrounded by the outer heating means 4 at a fixed position with simultaneous pulling toward right by a gripping means holding the glass rod at the right end at a pulling velocity of $V_2$ which is larger than $V_1$. The section 3 of the glass rod surrounded by the outer heating means 4 is heated and brought into a softened and plastically deformable state so that the difference between the velocities $V_1$ and $V_2$, i.e. $V_2-V_1$, causes an effect of diameter reduction of the thus drawn glass rod to give a glass rod 2 having a reduced diameter $V_2$. When adequate control is obtained in the feed and pulling velocities and the intensity of heating with simultaneous rotation of the glass rod, downward bending of the portion 5 of the glass rod having the reduced diameter and still in the softened state by the influence of gravity can be prevented considerably satisfactorily although complete prevention of this undesirable phenomenon is a rather very difficult matter due to the extreme delicacy required in the control of the conditions.

Figure 2A:
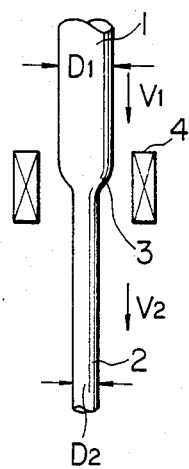
FIGS. 2a to 2c are schematic illustrations of the prior art method of vertical downward drawing for the diameter reduction of a glass rod.
Figure 2B:
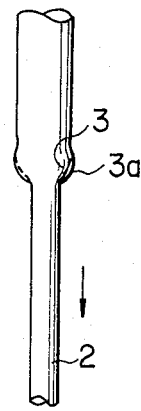
Figure 2C:
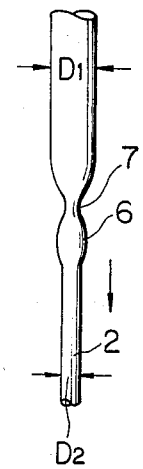

In the method of vertical downward drawing illustrated in FIGS. 2a to 2c, the base glass rod 1 of diameter $D_1$ is held in a substantially vertical disposition by gripping at the upper and lower ends thereof with an upper and a lower gripping means (not shown in the figures), respectively, and the upper gripping means is moved downwardly at a velocity $V_1$ while the lower gripping means is moved also downwardly at a velocity $V_2$ which is larger than $V_1$ so that the glass rod 1 is continuously and successively introduced into the heating zone surrounded by the outer heating means 4 and the glass rod in the thus heated portion 3 is softened into a plastically deformable state and drawn to be imparted with a reduced diameter $D_2$.

Although this method of vertical downward drawing has no problems when an ideal control is obtained in the working conditions as is illustrated in FIG. 2a, such an ideal control is a very difficult matter and rarely obtained in practical operations. FIG. 2b illustrate the most frequently occurring undesirable drawing conditions in which the softened portion 3 in a plastically deformable state sometimes sags down by the influence of the gravity to form a sagging bulge 3a as a result of even a very slight unbalance between and fluctuations in the feed velocity $V_1$ and the pulling velocity $V_2$ along with an inadequate heating intensity of the outer heating means 4. Therefore, the glass rod as drawn 2 has a diameter profile illustrated in FIG. 2c in which the glass rod 2 of the reduced diameter $D_2$ may have a bulge 6, i.e. a portion having a diameter larger than $D_2$, and a constriction 7, i.e. a portion having a diameter smaller than $D_2$.

FIGS. 3a to 3c, on the other hand, schematically illustrate the working conditions in the inventive method of vertical upward drawing in which the base glass rod 1 having a diameter $D_1$ is held also in a substantially vertical disposition by a lower and an upper gripping means (not shown in the figure) which are moved upwardly at a velocities of $V_1$ and $V_2$, respectively, $V_2$ being larger than $V_1$, so that the glass rod at the heated and softened section 3 surrounded by the outer heating means 4 is drawn to be imparted with a reduced diameter $D_2$. The downward arrow near the outer heating means 4 indicates that the heating means 4 in this figure is moved downwardly although the heating means 4 can be held at a fixed height. It is of course that the formation of the sagging bulge can take place also in this case but the influence of such a sagging bulge, if any, is unexpectedly small on the variation of the reduced diameter $D_2$ of the drawn glass rod 2 so that a much better control is obtained in the diameter reduction of the glass rod than in the prior art methods such as the vertical downward drawing method. Although the exact mechanism is not well understood for such an unexpected result, it is presumable that a sagging bulge, if produced, is under a pulling influence in the direction reverse to the gravity so that the sagging bulge can be received by the glass rod 1 before drawing to give little influence to the glass rod 2 after drawing which is in a continuous upward movement.

As an example, a fused quartz glass rod having a diameter of $18\pm0.5$ mm and a length of 300 mm was held in a substantially vertical disposition and drawn upwardly as is illustrated in FIG. 3a at a feed velocity and a pulling velocity of 20 mm/minute and about 100 mm/minute, respectively, with the outer heating means held at a fixed height. The pulling velocity was under computerized control with the measured value of the diameter of the drawn glass rod as the input signal to the computer. The thus obtained drawn glass rod had a diameter of $8\pm0.03$ mm and a length of about 1500 mm.

What is claimed is:

1. A method for reducing the diameter of a rod or tube of glass which comprises the steps of:
    (a) holding the base rod or tube of glass in a substantially vertical disposition by gripping at the upper and lower ends thereof with an upper and a lower gripping means, respectively;
    (b) heating a section of the glass rod or tube with an outer heating means so as to bring the glass material of the rod or tube in the section to a softened and plastically deformable state;
    (c) moving the upper gripping means upwardly along the axial direction of the glass rod or tube while the lower gripping means is not moved upwardly along the axial direction of the glass rod or tube or is moved upwardly at a velocity smaller than the upward moving velocity of the upper gripping means so that the glass rod or tube in the heated section is drawn to be imparted with a reduced diameter;
    (d) successively decreasing the distance between the outer heating means and the lower gripping means; and
    (e) cooling the heated and softened glass rod or tube with plastic deformability in the section drawn and imparted with a reduced diameter to solidify.

2. The method as claimed in claim 1 wherein the step (d) is performed by upwardly moving the lower gripping means, the outer heating means being held at a fixed height.

3. The method as claimed in claim 1 wherein the step (d) is performed by downwardly moving the outer heating means, the lower gripping means being held at a fixed height.

4. The method as claimed in claim 1 wherein the upper and the lower gripping means are rotated at the same velocity in the same direction around the axis of the glass rod or tube.

5. The method as claimed in claim 1 wherein the velocity of the upward movement of the upper gripping means is under control of a control means with the value of at least one of the diameters of the glass rod or tube determined directly below, within and directly above the section undergoing plastic deformation by drawing as the input signal to the control means.

* * * * *